United States Patent Office 3,370,040
Patented Feb. 20, 1968

3,370,040
KETYL OF A VINYLIDENE KETONE, A DIFFERENT UNSATURATED MONOMER, AND A CROSS-LINKING AGENT TERPOLYMER
Massimo Baer, Longmeadow, Mass., assignor to Monsanto Company, a corporation of Delaware
No Drawing. Filed Nov. 14, 1963, Ser. No. 323,574
10 Claims. (Cl. 260—63)

This invention relates to novel insoluble cross-linked polymeric anionic materials. More particularly, the invention relates to a class of insoluble cross-linked polymeric anionic materials which are useful as purifying agents for removing acidic impurities from organic liquids.

Because of the sensitivity of anionic polymerization systems to acidic impurities, i.e., proton donors, which destroy or consume the growing chains and initiator, solvents and monomers to be employed in such polymerization systems should be substantially free of impurities having a pKa value lower than that of the monomers to be polymerized, i.e., impurities which are more highly acid than the monomers. Many materials known to be capable of reacting with the acidic impurities cannot be used to purify the solvents and monomers, because in order to be suitable as a purifying agent in this application a material must satisfy these general requirements:

(1) It must be capable of removing the acidic impurities without contaminating the solvents and/or monomers with another impurity which reacts with anionic initiators, and (2) It must be inert to the liquid being purified, e.g., it must be incapable of initiating polymerization of the monomer being purified.

As used throughout the specification, terms referring to acidity should be understood as follows in the sense of the definitions derived from the proton-transfer theory of acids and bases:

(1) Acid—product obtained by adding a proton to a base, a base being any substance which, because of an unshared electron pair, can accept a proton, (2) Conjugate acid—acid related to a particular base in being the product obtained by adding a proton to that base, (3) pKa value—negative logarithm of the dissociation constant of an acid.

It will be noted that, when understood in this sense, the term "acid" is not restricted to the inorganic, carboxylic, and sulfonic compounds conventionally designated as acids, i.e., compounds having low pKa values of up to about 10, but also embraces compounds of much higher pKa value.

One object of this invention is to provide means for purifying organic liquids of acidic impurities, i.e., impurities having a pKa value lower than that of the organic liquid.

Another object is to provide means for purifying organic liquids of acidic impurities without contaminating the liquids with other impurities capable of reacting with anionic polymerization initiators.

A further object is to provide means for purifying organic liquids of acidic impurities without causing reaction of the liquid being purified.

These and other objects are attained by purifying an organic liquid of acidic impurities by contacting the organic liquid with a mono- or di-alkali metal ketyl or alkaline earth metal ketyl of an insoluble, cross-linked interpolymer of (a) a vinylidene ketone of the general formula:

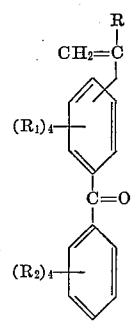

(b) a cross-linking agent containing multiple ethylenic unsaturation, and (c) an optional interpolymerizable monomer(s). In the above structural formula, R is either methyl or hydrogen and each of the four $R_1$ groups as well as each of the four $R_2$ groups is an independently selected hydrogen or lower alkyl, i.e., from 1 to 4 carbon atoms.

The following examples are presented in illustration of the invention and are not intended as limitations thereon. Where parts are mentioned they are parts by weight.

*Example I*

A suitable reaction vessel is charged with 300 parts of water, followed by addition of 1 part of bentonite with agitation. The slurry is heated to about 65° C., and a mixture of 95 parts of vinyl benzophenone, 5 parts of divinyl benzene and 1 part of benzoyl peroxide is added thereto. The air in the vessel is purged with nitrogen, and the contents are heated at 90° C. for 20 hours and then at about 120° C. for 12 hours. The batch is cooled and discharged into a centrifuge where the suspended solids are collected and washed with hot water. The interpolymer beads are dried in a forced draft air oven for 12 hours at about 120° C. and washed with 1,2-dimethoxyethane to form substantially pure beads of a cross-linked vinyl benzophenone/divinyl benzene interpolymer.

A molar solution of sodium naphthalene in 1,2-dimethoxyethane is passed through a column containing the interpolymer beads until the concentration of sodium naphthalene in the effluent solution indicates no further capacity of the interpolymer to react with sodium. The column of beads is then washed with 1,2-dimethoxyethane to remove residual sodium naphthalene and other soluble impurities. The product is an insoluble polymeric anionic material in which substantially all of the ketone units of the cross-linked vinyl benzophenone/divinyl benzene interpolymer (95:5) have been converted to the di-sodium ketyl.

The same procedure of interpolymerizing an alkenyl benzophenone type monomer with a cross-linking agent and optional other monomer(s) by suspension polymerization to form beads of a cross-linked interpolymer and then reacting the beads with an alkali metal or alkaline earth metal naphthalene, either completely or in equivalent proportions, to form insoluble, cross-linked anionic polymeric ketyls is used to prepare the following mono- or di-metal ketyls:

*Example II*

The di-sodium ketyl of an interpolymer (50:40:10) of isopropenyl benzophenone, butadiene-1,3 and divinyl benzene.

Example III

The mono-lithium ketyl of an interpolymer (45:35:20) of vinyl benzophenone, styrene, and N,N-diallylacrylamide.

Example IV

The mono-potassium ketyl of an interpolymer (95:5) of vinyl benzophenone and divinyl benzene.

Example V

The mono-sodium ketyl of an interpolymer (40:50:10) of vinyl benzophenone, styrene, and divinyl benzene.

Example VI

The mono-cesium ketyl of an interpolymer (90:10) of isopropenyl benzophenone and divinyl benzene.

Example VII

The di-calcium ketyl of an interpolymer (95:5) of vinyl benzophenone and divinyl benzene.

In the following Example VIII, representative organic liquids which contain appreciable acid impurities in their raw state are purified using the indicated insoluble, cross-linked, anionic interpolymers of Examples I–VII as the purifying agents.

Example VIII

| Organic liquid: | Purifying agent |
|---|---|
| Benzene | Di-Na ketyl of vinyl benzophenone/divinyl benzene interpolymer (95:5) of Example I. |
| 1,2-dimethoxyethane | Di-Na ketyl of isopropenyl benzophenone/butadiene-1,3/divinyl benzene interpolymer (50:40:10) of Example II. |
| Methyl methacrylate | Mono-Li ketyl of vinyl benzophenone / styrene / N,N-diallylacrylamide interpolymer (45:35:20) of Example III. |
| Styrene | Mono-K ketyl of vinyl benzophenone/divinyl benzene interpolymer (95:5) of Example IV. |
| Butadiene | Mono-Na ketyl of vinyl benzophenone / styrene/ divinyl benzene interpolymer (40:50:10) of Example V. |
| Isoprene | Mono-Cs ketyl of isopropenyl benzophenone/divinyl benzene interpolymer (90:10) of Example VI. |
| Vinyl toluene | Di-Ca ketyl of vinyl benzophenone/divinyl benzene interpolymer (95:5) of Example VII. |

In each case purification is accomplished by passing the organic liquid through a column of beads of the purifying agent, and in each case the effluent from the column is an unreacted organic liquid substantially free of acidic impurities.

Example IX.—Demonstration of effectiveness of purification

A suitable reaction vessel is charged with half of a carefully-degassed solution of 100 parts of styrene in 980 parts of 1,2-dimethoxyethane, followed by the addition with agitation of half of a substantially pure, carefully-degassed solution of about 0.13 part of sodium naphthalene in 20 parts of 1,2-dimethoxyethane, an inert atmosphere being maintained in the vessel throughout the reaction. The reaction results in no polymerization because of destruction of the initiator by acidic impurities.

The second half of the carefully-degassed monomer solution described in the previous paragraph is passed through a column of beads of the mono-sodium ketyl of the vinyl benzophenone/styrene/divinyl benzene interpolymer (40:50:10) of Example V. The effluent from the column is charged to a suitable reaction vessel, followed by the addition with agitation of the second half of the substantially pure, carefully-degassed initiator solution, an inert atmosphere being maintained in the vessel throughout the reaction. The reaction results in substantially quantitative conversion of styrene to polystyrene of the theoretical molecular weight for the proportion of initiator employed.

The present invention relates to novel insoluble cross-linked polymeric anionic materials and to their use as purifying agents for organic liquids containing acidic impurities.

The insoluble cross-linked polymeric anionic materials or purifying agents of this invention are the alkali metal ketyls and the alkaline earth metal ketyls of insoluble, cross-linked interpolymers of (a) vinylidene ketones as hereinafter defined, (b) cross-linking agents as hereinafter defined, and (c) optionally present interpolymerizable monomer(s).

The vinylidene ketones employed in preparing the interpolymers correspond to the general formula

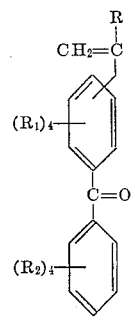

wherein R is methyl or hydrogen, and each of the four $R_1$ groups as well as each of the four $R_2$ groups is an independently selected hydrogen or lower alkyl, i.e., from 1 to 4 carbon atoms. Exemplary of such vinylidene ketones are ortho-, meta-, and para-vinyl benzophenone, ortho-, meta-, and para-isopropenyl benzophenone, 3-methyl-4-vinyl-benzophenone, 2-ethyl-4-vinyl-benzophenone, 2-tertiary-butyl-4-vinyl-benzophenone, 3-methyl-4'-vinyl-benzophenone, 2,2'-dimethyl-4-vinyl-benzophenone, etc. Mixtures of such monomers may be used.

The cross-linking agents employed in preparing the interpolymers contain multiple ethylenic unsaturation. Exemplary of such cross-linking agents are divinyl benzene, divinyl toluene, divinyl xylene, divinyl ethylbenzene, diisopropenyl benzene, trivinyl benzene, para-diallyl benzene, allyl silanes, etc. Other useful cross-linking agents are those which, as a chemically-combined unit of the interpolymer, contain active hydrogens which are themselves replaceable with alkali metal or alkaline earth metal. Such cross-linking agents include, for example, divinyl naphthalene, trivinyl naphthalene, polyvinyl anthracene, diallyl melamine, N,N-diallylacrylamide, and the like. Mixtures of such cross-linking agents may be used.

As optional components of the interpolymers are other interpolymerizable monomers. Exemplary of such interpolymerizable monomers are styrene and the alpha- or aryl-substituted alkylstyrenes such as alphamethylstyrene, ortho-, meta- or para-methylstyrenes, etc., vinyl ethers, acrylic or methacrylic acids or the alkyl esters thereof such as methyl acrylate, methyl methacrylate, etc., conjugated dienes such as butadiene-1,3, isoprene, etc. Various other polymers utilizable in preparing the interpolymers will be obvious to those skilled in the art. Mixtures of such interpolymerizable monomers may be used.

The interpolymers should contain from about 30 to 99% by weight of the vinylidene ketone, from about 1 to 20% by weight of the cross-linking agent, and from zero to about 70% by weight of the interpolymerizable monomer(s). They can be prepared by any suitable polymerization technique, such as, for example, chemical reaction between, e.g., styrene and benzoyl chloride in the presence of aluminum trichloride. However, they are most advantageously prepared by suspension polymerization of the monomers to form polymer beads, as demonstrated in Example I, or by impregnating an inert carrier, e.g., silica gel, alumina, calcium sulfate, carbon black, diatomaceous earths, clays, etc., with the monomers and then polymerizing to form a thin coating of interpolymer on a large surface of the inert carrier.

The purifying agents of this invention are prepared by reacting the above described insoluble, cross-linked interpolymers with a metal of Group IA or IIA of the periodic classification of the elements, i.e., with Li, Na, K, Rb, Cs, Mg, Ca, Ba, or Sr, to form the metal ketyl of the interpolymer, thus creating an insoluble cross-linked polymeric anionic material. This reaction can be accomplished by contacting the interpolymer in any suitable manner with a solution or dispersion of the metal in an inert liquid medium or, more efficiently, by contacting the interpolymer with a solution or dispersion in an inert liquid medium of an organo-metallic compound of the metal whose conjugate acid is weaker than that contained in the insoluble polymer. Advantageously, the interpolymer is reacted with the metal by contacting it with a solution of an ion-radical adduct, e.g., sodium naphthalene, in a polar solvent such as 1,2-dimethoxyethane, as demonstrated in Example I. Alternatively, the interpolymer may be reacted directly with the elemental metal itself in the presence of a polar organic liquid which will serve to swell the interpolymer bead rendering them relatively porous so as to increase the surface area and contact with the elemental metal. The added presence of catalytic quantities of, e.g., naphthalene, biphenylene, diphenyl ethylene, etc. will serve to accelerate the reaction.

The treatment of the interpolymer with the metal-containing composition is preferably continued until the capability of the interpolymer to react with the alkali metal or alkaline earth metal is exhausted in order to furnish the interpolymer with the maximum number of possible sites for subsequent reaction with acidic impurities contaminating the organic liquids to be purified. However, this exhaustion of the capability of the interpolymer to react with alkali metal or alkaline earth metal is obviously not required to make the cross-linked polymeric anionic materials effective as purifying agents, particularly when the interpolymer contains a large number of ketone units capable of reacting with alkali metal or alkaline earth metal. In many instances, it may be preferred to form only the mono-metal ketyl or even interpolymers wherein as few as, e.g., 50% of the ketone groups are converted to ketyls. For instance, the di-metal ketyl wherein both the oxygen and the carbon of the carbonyl group is complexed with metal is extremely alkaline in nature, due to the strong basicity of the carbon ion, may, in many instances wherein vinylidene monomers are being purified, tend to polymerize the monomer. In such instances the mono-ketyl, or partial ketyl, is used.

After completion of the treatment of the insoluble interpolymer with the alkali metal or alkaline earth metal, the cross-linked polymeric anionic material is preferably washed with an inert solvent, e.g., liquid ammonia, to remove unreacted metal, metal compound, or residue of metal compound.

The insoluble cross-linked polymeric anionic materials of this invention are effective as agents for purifying organic liquids of acidic impurities. The invention is particularly applicable to the purification of organic liquids to be employed in anionic polymerization systems, e.g., anionically-polymerizable vinylidene monomers such as styrene, vinyl toluene, o-, m-, and p-methoxystyrenes, butadiene, isoprene, methyl methacrylate, etc., or solvents such as benzene, hexane, tetrahydrofuran, 1,2-dimethoxyethene, etc., but it can also be applied to the purification of any organic liquid which is contaminated by impurities having a pKa value lower than that of the organic liquid to be purified.

Purification of the organic liquids is accomplished by contacting the organic liquid with the purifying agent in any suitable manner, advantageously by passing the organic liquid through a column of beads of the purifying agent, as demonstrated in Examples VIII and IX. After being used to purify an organic liquid, the insoluble cross-linked polymeric anionic material can be regenerated by repeating the metal treatment used in preparing the purifying agent.

For greatest efficiency in removing acidic impurities, the purifying agent should have as high a pKa value as is consistent with the requirement that it be inert to the organic liquid being purified.

The invention is particularly advantageous in that it provides novel insoluble cross-linked polymeric anionic materials which, when used as purifying agents for organic liquids, enable the removal from solvents and monomers of substantially all of the acidic impurities which interfere with anionic polymerization without contaminating the solvents and monomers with other impurities which would react with anionic initiators.

It is obvious that many variations may be made in the products and processes set forth above without departing from the spirit and scope of this invention.

What is claimed is:

1. A ketyl of a metal selected from the class consisting of alkali metals and alkaline earth metals with an insoluble, cross-linked interpolymer comprising in chemical combination (a) from about 30 to 99% by weight of a vinylidene ketone corresponding to the general formula

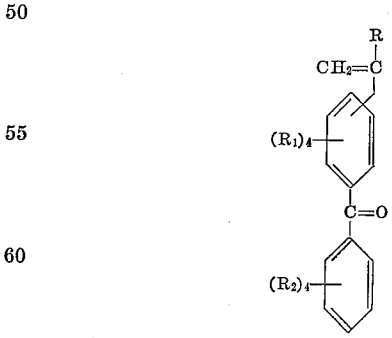

(b) from about 1 to 20% by weight of a cross-linking agent containing multiple ethylenic unsaturation, and (c) from zero to about 70% by weight of an interpolymerizable ethylenic monomer other than (a) or (b); wherein in the above structural formula R is selected from the class consisting of hydrogen and methyl, each $R_1$ is independently selected from the class consisting of hydrogen and lower alkyls and each $R_2$ is independently selected from the class consisting of hydrogen and lower alkyls.

2. A ketyl as in claim 1 wherein the vinylidene ketone is vinyl benzophenone.

3. A ketyl as in claim 2 wherein the cross-linking agent is divinyl benzene.

4. A ketyl as in claim 2 wherein (c) is styrene.

5. A ketyl as in claim 2 wherein the metal is sodium.

6. A ketyl as in claim 2 wherein the metal is potassium.

7. A ketyl as in claim 2 wherein the metal is calcium.

8. A ketyl as in claim 1 wherein the vinylidene ketone is isopropenyl benzophenone.

9. A ketyl as in claim 8 wherein the cross-linking agent is divinyl benzene.

10. A ketyl as in claim 9 wherein (c) is styrene.

References Cited

UNITED STATES PATENTS

| | | | |
|---|---|---|---|
| 2,894,938 | 7/1959 | Chapin | 260—88.1 |
| 2,809,187 | 10/1957 | Chapin | 260—88.1 |
| 3,079,428 | 2/1963 | Baer | 260—486 |
| 3,062,872 | 11/1962 | Blood | 260—486 |

OTHER REFERENCES

Chem. Abstr., vol. 57, September 1962, p. 7459C. Braun and Loeflund, "Polymeric Metal Ketyls."

WILLIAM H. SHORT, *Primary Examiner.*

L. LEE, D. P. CLARKE, *Assistant Examiners.*